Jan. 21, 1958 R. L. PLOUFFE, JR 2,820,909

DELAY LINE PULSE SHAPER

Filed Sept. 12, 1956

INVENTOR
ROBERT L. PLOUFFE, JR.
BY Alfred C. Hill
AGENT

United States Patent Office 2,820,909

Patented Jan. 21, 1958

2,820,909

DELAY LINE PULSE SHAPER

Robert L. Plouffe, Jr., Livingston, N. J., assignor to International Telephone and Telegraph Corporation, Nutley, N. J., a corporation of Maryland Application September 12, 1956, Serial No. 609,373

13 Claims. (Cl. 307—106)

This invention relates to pulse shapers and more particularly to an improved pulse shaper employing a reflecting delay line which reverses the polarity of a pulse signal incident on the reflecting end thereof.

An object of this invention is to provide an improved reflecting delay line pulse shaper.

Another object of this invention is to provide an improved short-circuited delay line pulse shaper.

Still another object of this invention is to provide a means for terminating the input end of a short-circuited delay line so as to obtain a pulse having substantially twice as much voltage as is ordinarily obtained in prior art arrangements.

A feature of this invention is the provision of an improved input terminating circuit including a series circuit. This series circuit includes a resistor having a value equal to substantially the characteristic impedance of the short-circuited delay line and a switch device, such as a semiconductor diode, connected with respect to positive input pulses and negative reflected pulses to be responsive to the positive input pulses to said delay line to render the input end of said delay line open-circuited and responsive to negative reflected signals to render said input end terminated in said characteristic impedance. There is further provided an output connection at the junction of said diode and said resistor to remove therefrom a reshaped pulse having only positive polarity.

Figure 1:
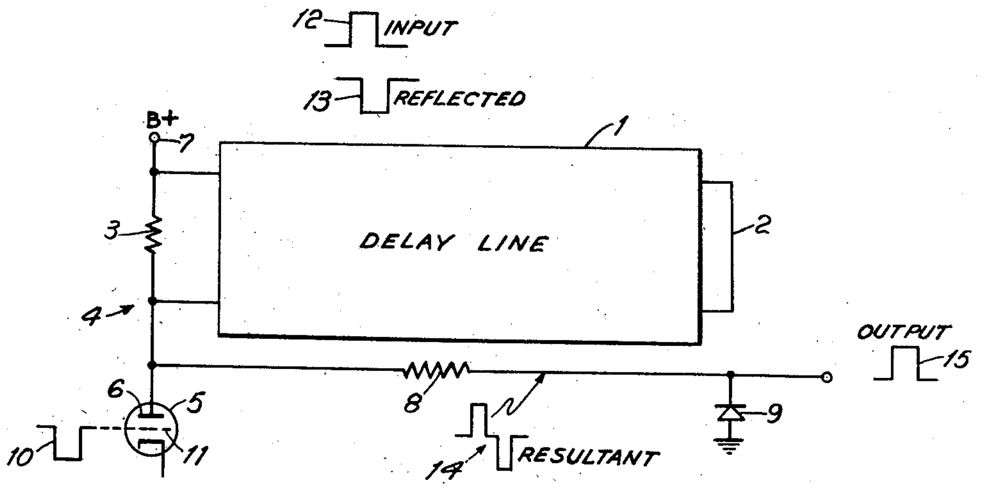
Fig. 1 (PRIOR ART)
Figure 2:
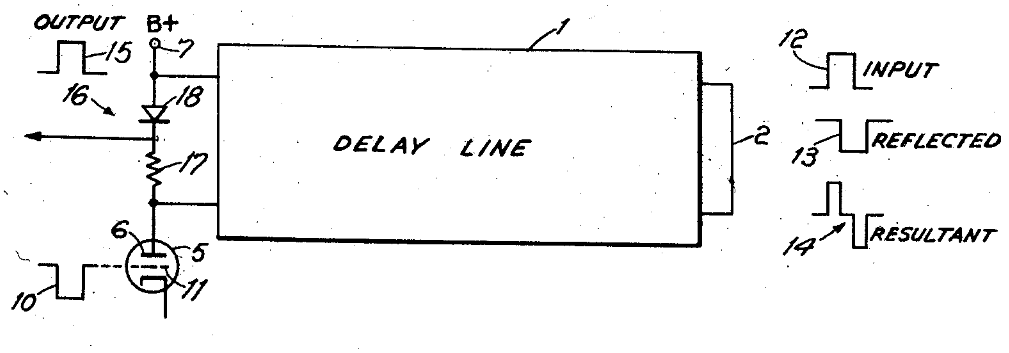

The above-mentioned and other features and objects of this invention will become more apparent by reference to the following description taken in conjunction with the accompanying drawings, in which:

Fig. 1 is a schematic diagram illustrating the short-circuited delay line pulse shaper known to the prior art; and Fig. 2 is a schematic representation of the short-circuited delay line pulse shaper of this invention.

Referring to Fig. 1, the delay line pulse shaper of the prior art is shown to include a delay line 1 short-circuited at the far end thereof as indicated at 2 and having an input termination resistor 3. The delay line 1 is illustrated to be coupled in the anode circuit 4 of a vacuum tube 5 wherein the input terminating resistor 3 is coupled between the anode 6 and a source of anode potential connected at terminal 7. Reshaped output pulses of delay line 1 are coupled from anode 6 by means of resistor 8 and clipped by the action of diode 9 to provide a reshaped pulse of only one polarity.

For purposes of describing the operation of delay line 1, a negative pulse 10 is coupled to grid 11 of tube 5 which results in a positive pulse being applied to the input of delay line 1 as illustrated by pulse 12. This pulse 12 travels down the delay line to the short circuit 2 and is reflected therefrom with negative polarity, as illustrated by pulse 13. The reflected pulse 13 would then appear at the output circuit connected to the anode 6 in conjunction with the input pulse 12. The delay line 1 is illustrated to have a time delay sufficient to change the width of the input pulse. The combining of input pulse 12 and reflected pulse 13 produces a resultant pulse as indicated at 14. This resultant pulse 14 is operated on by diode 9 to remove the negative portion of pulse 14, leaving only a positive pulse 15 having the desired width as is dictated by the time delay of delay line 1.

The value of terminating resistor 3 is equal to the characteristic impedance of delay line 1 is so that no reflection will occur from the input end of the delay line to the short-circuited end thereof. When the resistance of the input end terminating resistance 3 and the characteristic impedance of delay line 1 are considered, the voltage of the pulse applied to delay line 1 is equal to $$v_i = i_0 \times \frac{R_0}{2}$$

where $v_i$ equals the voltage into the delay line, $i_0$ equals the current through the tube 5 and $R_0$ is equal to the characteristic resistance of the delay line and the resistance of the input end terminating resistor. This occurs because the resistor 3 and the characteristic impedance of delay line 1 are substantially at parallel resistive combination and the voltage of the pulse applied to the delay line is divided in half by this parallel combination.

Referring to Fig. 2 and employing the same reference characters as applied in Fig. 1 for common circuit elements, the improvement of the delay line pulse shaper 1, short-circuited at the far end by short circuit 2, is shown to include a series circuit 16 including the normal terminating resistor 17 having a value equal to substantially the characteristic impedance of delay line 1 and a switch device 18, depicted herein to be a semiconductor diode. It is to be understood that a vacuum type diode could be used in place of a semiconductor diode or any other such electronic switching device which responds to the polarity of the signal applied thereto.

Let us again consider the operation of this circuit when pulse 10 is applied to grid 11 of vacuum tube 5 and a positive input pulse occurs at anode 6 such as indicated by pulse 12. Due to the connection of diode 18 and the polarity of input pulse 12, diode 18 is non-conducting and thus the input end of delay line 1 is effectively an open circuit. The direct current path to the anode supply voltage connected to terminal 7 is through the delay line. The exciting voltage of pulse 12 sees only the characteristic impedance, $R_0$ of the delay line 1. Thus, $v_i = i_0 \times R_0$ or a value twice as much as in the prior art circuit of Fig. 1. The resultant negative reflected pulse 13 due to its polarity and the connection of diode 18 acts to switch the diode to conduction and thus the input end of delay line 1 is terminated in the characteristic impedance of a delay line, the value of resistor 17 and the small forward conduction resistance of diode 18. This prevents reflection from the input end of a delay line to the short-circuited delay line thereof. The input pulse 12 and the reflected pulse 13 are combined in the anode circuit of tube 5 to provide the resultant pulse 14 which includes a narrowed positive pulse and a narrowed negative pulse, the width of these pulses being dependent upon the time delay of delay line 1. By taking the output at the junction of diode 18 and resistor 17, the diode 18 performs a third function. This third function is to clip off the negative portion of the resultant pulse 14 at the anode of the tube 5 thereby providing an output pulse 15 resulting in substantially the same pulse as occurred at diode 9 of Fig. 1. Thus, the circuit of Fig. 2 provides an improved input end terminating circuit which will produce substantially the same pulse output as the circuit of Fig. 1 but increase by a factor of two, the value of voltage of the pulse initiated on the delay line and the pulse extracted at the output, the junction of resistor 17 and diode 18.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pulse shaper comprising a delay line short circuited at one end thereof and a series circuit terminating the other end of said delay line including a resistor having a value equal to substantially the characteristic impedance of said delay line and a switch device poled to be responsive to input signals to said delay line to render said other end thereof open circuited and responsive to signals reflected from said one end of said delay line to render said other end thereof terminated in said characteristic impedance.

2. A pulse shaper comprising a delay line short circuited at one end thereof to provide a reflected pulse opposite in polarity to the input pulse applied at the other end thereof and a series circuit terminating said other end of said delay line including a resistor having a value equal to substantially the characteristic impedance of said delay line and a switch device poled to be responsive to said input pulse to terminate said other end of said delay line in an open circuit, to be responsive to said reflected pulse to terminate said other end of said delay line in said characteristic impedance and to remove pulses of said opposite polarity.

3. A pulse shaper comprising a delay line, means to couple pulse signals of one polarity to one end of said delay line, means to short circuit the other end of said delay line to reflect pulse signals therefrom having a polarity opposite to said one polarity, and a series circuit coupled across said one end of said delay line for termination thereof, said series circuit including a resistor having a value equal to substantially the characteristic impedance of said delay line and an electronic switch device connected to respond to pulse signals of said one polarity to render said one end of said delay line open circuited and to respond to pulse signals of said opposite polarity to render said one end of said delay line terminated in said characteristic impedance.

4. A pulse shaper comprising a delay line, means to couple pulse signals of one polarity to one end of said delay line, means to short circuit the other end of said delay line to reflect pulse signals therefrom having a polarity opposite to said one polarity, a series circuit coupled across said one end of said delay line for termination thereof, said series circuit including a resistor having a value equal to substantially the characteristic impedance of said delay line and an electronic switch device connected to respond to pulse signals of said one polarity to render said one one end of said delay line open circuited and to respond to pulse signals of said opposite polarity to render said one end of said delay line terminated in said characteristic impedance, and an output means coupled to the junction of said resistor and said switch device to remove therefrom reshaped pulse signals having a polarity equal to only said one polarity.

5. A pulse shaper comprising a delay line short circuited at one one thereof and a series circuit terminating the other end of said delay line including a resistor having a value equal to substantially the characteristic impedance of said delay line having one end thereof coupled to one terminal of said other end of said delay line and an electronic switch device connected to have the normal positive element coupled to the other terminal of said other end of said delay device and the normal negative element coupled to the other end of said resistor whereby the voltage of the reshaped pulse signal is substantially increased.

6. A pulse shaper comprising a delay line, means to couple pulse signals of one polarity to one end of said delay line, means to short circuit the other end of said delay line to reflect pulse signals therefrom having a polarity opposite to said one polarity, a series circuit coupled across said one end of said delay line for termination thereof, said series circuit including a resistor having a value equal to substantially the characteristic impedance of said delay line and a rectifier connected to respond to pulse signals of said one polarity to render said one end of said delay line open circuited and to respond to pulse signals of said opposite polarity to render said one end of said delay line terminated in said characteristic impedance.

7. A pulse shaper comprising a delay line, means to couple pulse signals of one polarity to one end of said delay line, means to short circuit the other end of said delay line to reflect pulse signals therefrom having a polarity opposite to said one polarity, a series circuit coupled across said one end of said delay line for termination thereof, said series circuit including a resistor having a value equal to substantially the characteristic impedance of said delay line and a rectifier connected to respond to pulse signals of said one polarity to render said one end of said delay line open circuited and to respond to pulse signals of said opposite polarity to render said one end of said delay line terminated in said chaarcteristic impedance, and an output means coupled to the junction of said resistor and said rectifier to remove therefrom reshaped pulse signals having a polarity equal to only said one polarity.

8. A pulse shaper comprising a polarity reversing reflecting delay line, means to couple pulse signals of a given polarity to the input of said delay line and a series circuit coupled across the input of said delay line including a resistor having a value equal to substantially the characteristic impedance of said delay line and a rectifier poled to respond to the pulse signals of said given polarity to terminate the input of said delay line in an open circuit and to respond to pulse signals of the opposite polarity to terminate the input of said delay line in said characteristic impedance.

9. A pulse shaper comprising a polarity reversing reflecting delay line, means to couple pulse signals of a given polarity to the input of said delay line, a series circuit coupled across the input of said delay line including a resistor having a value equal to substantially the characteristic impedance of said delay line and a rectifier poled to respond to the pulse signals of said given polarity to terminate the input of said delay line in an open circuit and to respond to pulse signals of the opposite polarity to terminate the input of said delay line in said characteristic impedance and an output path coupled to the junction of said resistor and said rectifier to remove therefrom reshaped pulse signals having a polarity equal to only said given polarity.

10. A pulse shaper comprising a delay line, means to couple positive pulse signals to one end of said delay line, means to short circuit the other end of said delay line to provide negative pulse signals reflected therefrom, a series circuit coupled across said one end of said delay line for termination thereof in an open circuit in the presence of positive pulse signals and the characteristic impedance of said delay line in the presence of negative pulse signals, said series circuit including a resistor having a value substantially equal to said characteristic impedance and a diode, said diode being connected for conduction during the presence of negative pulses and nonconduction during the presence of positive pulses, and an output terminal coupled to the cathode of said diode.

11. A pulse shaper comprising a delay line, means to couple positive pulse signals to one end of said delay line, means to short circuit the other end of said delay line to provide negative pulse signals reflected therefrom, a series circuit coupled across said one end of said delay line for termination thereof in an open circuit in the presence of positive pulse signals and the characteristic impedance of said delay line in the presence of negative pulse signals, said series circuit including a resistor having a value substantially equal to said characteristic impedance and a diode, said diode being connected for conduction during the presence of negative pulses and nonconduction during the presence of positive pulses.

12. A pulse shaper for employment in the anode circuit of a vacuum tube circuit comprising a delay line having one terminal of one end thereof coupled to the anode of the vacuum tube and the other terminal of said one end coupled to the anode supply voltage, means to couple negative pulse to the control grid of said vacuum tube, means to short circuit the other end of said delay line to provide negative-pulse signals reflected therefrom, a series circuit coupled between the anode of said vacuum tube and the anode supply voltage across said one end of said delay line for termination thereof in an open circuit in the presence of positive pulse signals and the characteristic impedance of said delay line in the presence of negative pulse signals, said series circuit including a resistor having a value substantially equal to said characteristic impedance and a semi-conductor diode, one end of said resistor being connected to the anode of said vacuum tube, the other end of said resistor being connected to the cathode of said diode and the anode of said diode being connected to said anode supply voltage, and an output terminal coupled to the junction of said resistor and said diode.

13. A pulse shaper for employment in the anode circuit of a vacuum tube circuit comprising a delay line having one terminal of one end thereof coupled to the anode of the vacuum tube and the other terminal of said one end coupled to the anode supply voltage, means to couple negative pulse to the control grid of said vacuum tube, means to short circuit the other end of said delay line to provide negative-pulse signals reflected therefrom, a series circuit coupled between the anode of said vacuum tube and the anode supply voltage across said one end of said delay line for termination thereof in an open circuit in the presence of positive pulse signals and the characteristic impedance of said delay line in the presence of negative pulse signals, said series circuit including a resistor having a value substantially equal to said characteristic impedance and a semi-conductor diode, one end of said resistor being connected to the anode of said vacuum tube, the other end of said resistor being connected to the cathode of said diode and the anode of said diode being connected to said anode supply voltage.

No references cited.